Aug. 12, 1947.     E. A. STALKER     2,425,650
HELICOPTER ROTOR WITH BLADE-BALANCING MECHANISM
Filed July 16, 1943
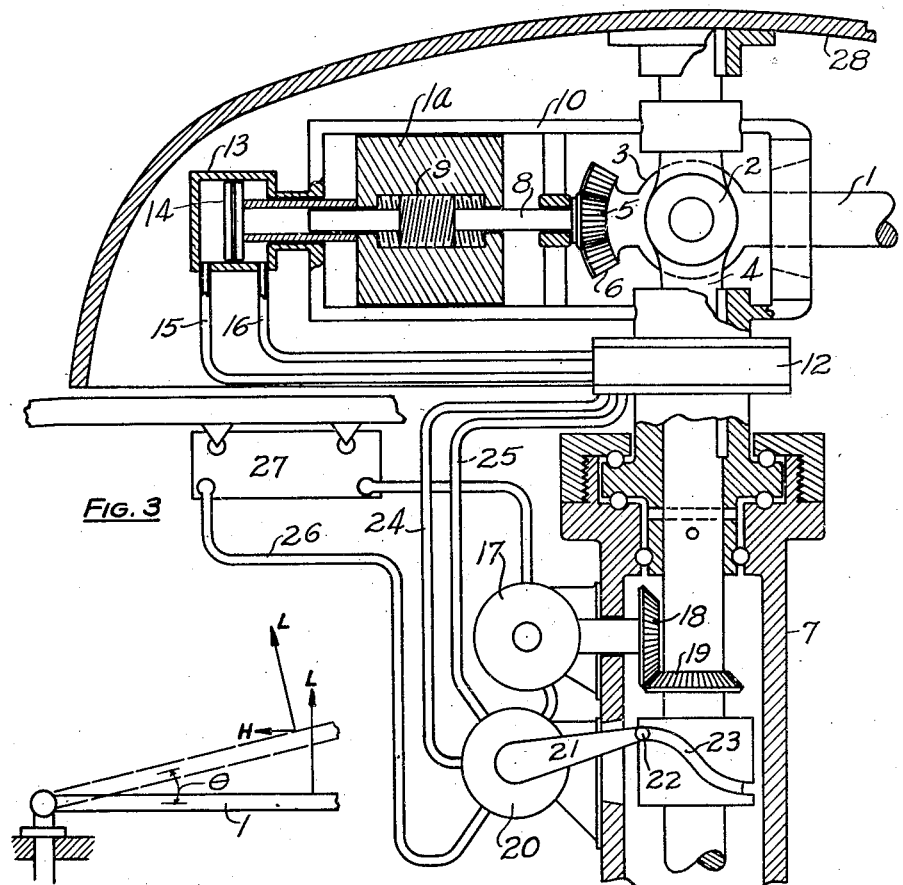
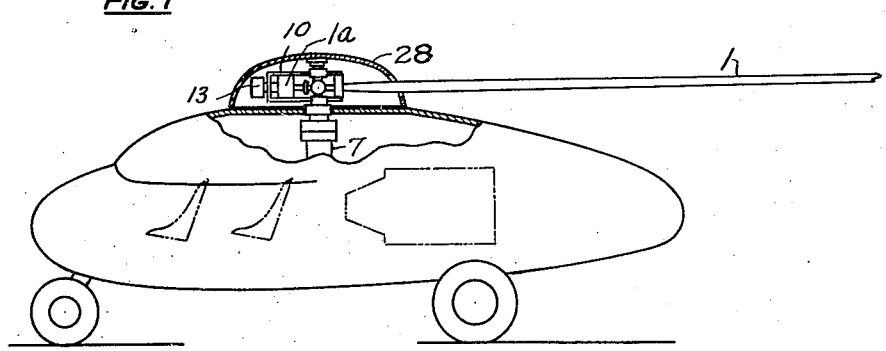
INVENTOR.
Edward A. Stalker
By Marechal and Biebel
ATTORNEYS Patented Aug. 12, 1947

2,425,650

UNITED STATES PATENT OFFICE 2,425,650

HELICOPTER ROTOR WITH BLADE-BALANCING MECHANISM

Edward A. Stalker, Bay City, Mich.

Application July 16, 1943, Serial No. 494,916

15 Claims. (Cl. 244—17)

My invention relates to direct lift aircraft employing a rotating wing.

It has for its principal object to provide a helicopter rotor in which the aerodynamic forces on the wing system or blades are substantially balanced so that objectionable vibration is overcome.

It is a further object to provide a weight the position of which is controlled in response to the flapping of the blade to balance the forces created during rotation and thereby to suppress the vibrations while leaving the blade substantially free in its vertical flapping movement.

Other objects and advantages will appear from the following description, the accompanying drawings and the appended claims.

In the accompanying drawings which illustrate a preferred embodiment of the invention—

Fig. 1 is a diagrammatic view showing the force vectors which are present in a helicopter blade;

Fig. 2 is a fragmentary side view of an aircraft constructed in accordance with the present invention, partly in section; and Fig. 3 is a fragmentary vertical section of the hub and associated parts of Fig. 2.

It is well known that only one wing is necessary to support an aircraft by rotating about an axis provided a balancing weight is disposed on the opposite side of the axis from the wing to balance the centrifugal force. However only the inertia forces are balanced by such a weight as used, and there are aerodynamic forces present which vary as the blades rotate producing vibration which cannot be properly balanced by a weight the center of gravity of which occupies a fixed position relative to the axis of rotation.

In the drawing is shown a wing 1 whose hub 2 is hinged at 3 to the shaft 4 being thus supported for both rotation about an upright axis and for vertical flapping. The shaft 4 is suitably mounted for rotation about an upright axis in the sleeve member 7 which extends upwardly from the aircraft, the lower end of shaft 4 being suitably connected to a source of power to drive the same. When the blade oscillates or flaps under the action of the relative wind which varies from retreating position to advancing position of the wing, the lift force changes direction so that in the up position of the wing there is a horizontal aerodynamic force component H. If the wing declines below the horizontal position the force H reverses direction. In any case as the attitude of the wing changes the force H changes. This varying force variation is an important cause of vibration in rotary wing aircraft.

With a single wing it is necessary to have a balancing weight 1a on the opposite side of the axis of rotation so that the centrifugal force of the wing is balanced. The force H can be balanced by the weight 1a if the weight is moved outward or inward relative to the axis of shaft 4. For instance if the wing is ascending in its oscillation and the force H acting toward the axis is increased, the weight 1a should be moved toward the axis to reduce the opposing centrifugal force thereon by an amount equal to H. If H decreases in magnitude the weight should be shifted outward from the axis. In all cases, the change in the position of weight 1a is made to take place in the direction and to the extent necessary to compensate for and substantially balance the horizontally acting component H, thereby overcoming the objectionable vibration otherwise produced by such a weight.

It can be seen from Fig. 1 that the force H is proportional to the sine of the angle $\theta$, the angle through which the wing has oscillated. For small angles the sine can be taken as equal to the angle expressed in radians. The mechanism employed shifts the weight 1a a distance proportional to the angle $\theta$. As shown in Fig. 3, a frame 10 is fixed to and rotatable with the upper end of shaft 4 on the side opposite blade 1, the frame forming a guide for a weight 1a which is slidable therein in a radial direction toward and away from the axis of rotation of the shaft. The weight is internally threaded and receives an adjusting shaft 8 which carries a threaded block 9 for engaging in said recess. At its inner end, shaft 8 is formed with a pinion 5 which is in mesh with a gear sector formed on a rearwardly projecting part of the blade 1.

Thus it will be understood that in response to the flapping movement of blade 1, sector 6 turns pinion 5 and shaft 8 proportionally, and by reason of the threaded relation between block 9 and the recess in the weight 1a, the latter is caused to travel inwardly or outwardly to the proper extent to develop a balancing force equal and opposite to the component H. As shown the weight 1a is arranged to travel inwardly toward the axis of rotation in response to an increase in the flapping angle above the horizontal. As the flapping angle decreases, with the component H being correspondingly reduced, the weight 1a moves farther outward from the axis to maintain a proper balance of the forces. Should the blade drop below the horizontal, the direction of the component H is then reversed from the showing in Fig. 1, and the weight 1a moves still further away from the axis, to develop the proper balancing force. While a threaded connection has been illustrated between shaft 8 and weight 1a, it will be understood that other forms of connection may be used which will provide for movement of the weight either in direct relation to the flapping angle, or with a variable relation over the range of travel of the blade, to develop suitable balancing conditions throughout such range.

The counterweight 1a has a fairly large mass and so its inertia is large. To oscillate the weight backward and forward would require substantial energy to be supplied from the wing while executing its oscillation. This would tend to interfere with the flapping movement of the wing which should be substantially free to adapt its position to the relative wind to achieve lift free of lateral unbalance, a well known consideration in Autogiros and helicopters having flapping wings.

The reciprocating motion of the counterweight without objectionably restraining the free oscillation of the blade is accomplished by employing power to move the weight. A pump 17 fixed to housing sleeve 7 is driven from the shaft 4 by suitable gearing 18, 19. Fluid from a reservoir 27 is supplied under pressure by pump 17 to the valve 20. Two conduits 24 and 25 lead through a rotary connection 12 to conduits 15 and 16, respectively which are carried by and rotate with frame 10 and the hub 2. These conduits lead to a cylinder 13 carried on frame 10, and communicate with opposite sides of piston 14 which is directly connected by rod 14a with movable weight 1a. The rod 14a is preferably made hollow to receive the end of shaft 8 therein. The valve 20 has an arm 21 with a ball end fitting 22 into the cam guide 23 carried by and rotatable with shaft 4 so that rotation of shaft 4 moves the valve arm 21 and directs the pressure fluid into either of the tubes 24 and 25, for delivery to one side or the other of piston 14. Exhaust from the opposite side is returned through conduit 26 to the reservoir.

From the above it will be understood that upon rotation of shaft 4, either as a result of a power drive, or by autorotation, a fluid pressure is developed, and when the blade is on the advancing side where the lift and the horizontal component H are increasing, the cam 23 actuates the valve 20 to direct pressure fluid through conduits 24 and 15 and to the outside of piston 14, to develop a force acting to move the piston and with it the weight 1a radially inward. When the blade is on the retreating side, the cam actuates the valve to apply the pressure in the opposite direction. Thus the inertia of the weight is overcome by the fluid pressure application, and the rotation of shaft 8 with its threaded part serves primarily as a means to govern the rate of movement of the counterweight and make the change in centrifugal force proportional to the angle of oscillation.

The counterweight is housed in the hub covering 28 of large diameter so that the weight can be placed far from the shaft 4 to provide for developing a proper control force without the weight being of excessive size.

The present application is a continuation in part of application Serial No. 410,864 filed September 15, 1941.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in an aircraft of the direct lift type, a blade, means for supporting said blade on the aircraft for rotation about an upright axis and for flapping movement about an axis transverse to said upright axis, a weight, means for supporting said weight for rotation with said blade about said upright axis and for shifting movement toward and away from said axis, means for shifting said weight relative to said axis, and control means operated in response to a change in the flapping position of said blade for actuating said shifting means to cause the shifting of said weight relative to said upright axis to develop a predetermined centrifugal force opposing the force on said blade.

2. In combination in an aircraft of the direct lift type, a blade, means for supporting said blade on the aircraft for rotation about an upright axis and for flapping movement about an axis transverse to said upright axis, the flapping movement of said blade producing a force in a direction transverse to said upright axis, a weight, means for supporting said weight for rotation with said blade about said upright axis and for lateral shifting movement toward and away from said axis, said means being constructed and arranged to confine said shifting movement to the plane substantially transverse to said axis, means responsive to changes in the flapping position of said blade, and means controlled by said responsive means for effecting said shifting of the wetight in said transverse plane to develop a force substantially equal and opposite to said transverse force.

3. In combination in an aircraft of the direct lift type, a blade, means for supporting said blade on said aircraft for rotation about an upright axis and for flapping movement about an axis transverse to said upright axis, a weight, means for supporting said weight for rotation with said blade about said upright axis and for shifting movement toward and away from said axis, power operated means rotatable with said blade and said weight, means operatively connecting said power operated means and said weight for effecting the shifting of said weight, and means operated in response to changes in the flapping position of said blade for controlling said power operated means.

4. In combination in an aircraft of the direct lift type, a blade, means for supporting said blade on said aircraft for rotation about an upright axis and for flapping movement about an axis transverse to said upright axis, a weight, means for supporting said weight for rotation with said blade about said upright axis and for shifting movement toward and away from said axis, fluid pressure means for effecting the shifting of said weight, and means actuated in response to changes in the flapping position of said blade for controlling said fluid pressure means.

5. In combination in an aircraft, a rotating blade, a balancing weight, means for supporting said blade for rotation about an upright axis and for oscillation about an auxiliary axis transverse to said upright axis, the motion of said blade producing an unbalanced vibratory force, means for mounting said weight for rotation about said upright axis at a tip radius substantially less than the tip radius of said blade so that said weight is essentially a non-lifting balancing weight, auxiliary power means to move the said weight relative to said blade, and control means governed by the oscillation of the blade about said auxiliary axis to control the movement of said weight to balance said vibratory force.

6. In combination in an aircraft, a rotating blade, a hub, means for supporting said blade on said hub for rotation about an upright axis and for oscillation about an auxiliary axis transverse to said upright axis, the motion of said blade about said auxiliary axis producing an unbalanced vibratory force, a balancing weight, means for supporting said weight for rotation with said blade about said upright axis and for motion relative to the said blade and transverse of said upright axis, a hub covering to house said hub and said weight and shielding said weight from the relative wind exterior to said covering, means for mounting said covering on said hub for rotation therewith, and means to move said weight relative to the blade in coordination with the said oscillation of said blade to balance said vibratory force.

7. In combination in an aircraft, an only wing, means supporting the wing for rotation about an upright axis and for flapping oscillation relative to said axis, a counterweight mounted on said supporting means and disposed on the opposite side of said axis from the wing and constrained to rotate with the wing, a shaft interconnecting said wing and said weight adapted to be rotated by said oscillation of said wing, and means connected with said shaft to shift said weight spanwise relative to the wing.

8. In combination in an aircraft, a rotating wing, a weight, means for supporting said wing for rotation about an upright axis and for flapping oscillation about an auxiliary axis transverse to said upright axis, the motion of said wing producing an unbalanced vibratory force, means for mounting said weight on said supporting means at the opposite side of the upright axis from the wing said mounting means being constructed and arranged to guide said weight for movement in a path different from the flapping oscillation of said blade such that the center of gravity of said weight moves with its major component of movement in the plane substantially normal to said upright axis, and governing means operably inter-connecting said wing and said weight for coordinated shifting of the center of gravity of said weight relative to the wing in predetermined relation with said flapping oscillation of said wing.

9. In combination in an aircraft, a rotating wing, a weight, means for supporting said wing for rotation about an upright axis and for oscillation about an auxiliary axis transverse to said upright axis, the motion of said wing producing an unbalanced vibratory force, means for mounting said weight on said supporting means at the opposite side of the upright axis from the wing for motion relative to a plurality of axes including the upright axis, power means to superimpose a shifting motion on said weight to shift its center of gravity while it is rotating about said upright axis, and governing means operably connected to said wing and said power means to coordinate the shifting of the center of gravity of said weight to balance said vibratory force.

10. In combination in an aircraft, a rotating wing, a weight, means for supporting said wing for rotation about an upright axis and for flapping oscillation about an auxiliary axis transverse to said upright axis, the motion of said wing producing an unbalanced vibratory force, means for mounting said weight on said supporting means at the opposite side of the upright axis from the wing, said mounting means being constructed and arranged to guide said weight for movement in a path different from the flapping oscillation of said blade such that the center of gravity of said weight moves with its major component of movement in the plane substantially normal to said upright axis, power means to cause the shifting of the center of gravity of said weight relative to said upright axis while it is rotating about said upright axis, governing means operably connected to said wing and to said power means to coordinate the shifting of the center of gravity of said weight with said flapping movement of said wing to balance said vibratory force, and means operably connecting said power means to derive power from the rotation of said wing about said upright axis.

11. In combination in an aircraft, a rotating wing, a balancing weight, means for supporting said wing for rotation about an upright axis and for flapping oscillation about an auxiliary axis transverse to said upright axis, the motion of said wing producing an unbalanced vibratory force, means for mounting said weight on said supporting means at the opposite side of the upright axis from the wing for motion in a plane substantially normal to said upright axis, and control means interconnecting said wing and said weight including means for transmitting a force to said weight to move its center of gravity relative to said auxiliary axis of said wing in coordination with the flapping oscillation of the wing to balance said vibratory force.

12. In combination in an aircraft, a rotating wing, a balancing weight, means for supporting said wing for rotation about a principal axis and for flapping oscillation about an auxiliary axis transverse to said principal axis, the motion of said wing producing an unbalanced vibratory force, means for mounting said weight on said supporting means at the opposite of the upright axis from the wing for rotation about said principal axis at a tip radius substantially less than the tip radius of said wing so that said weight is essentially a non-lifting balancing weight, said mounting means being constructed and arranged to guide said weight for movement in a path different from the flapping oscillation of said blade such that the center of gravity of said weight moves with its major component of movement in the plane substantially normal to said upright axis, and control means operably inter-connecting said wing and said weight so that an oscillation of said wing shifts said weight relative to said upright axis to balance said vibratory force.

13. In combination in an aircraft, a rotating wing, a balancing weight, means for supporting said wing for rotation about an upright axis and for oscillation about an auxiliary axis transverse to said upright axis, the motion of said wing producing an unbalanced vibratory force, means for mounting said weight on said supporting means at the opposite side of the upright axis from the wing for rotation about said upright axis at a tip radius substantially less than the tip radius of said wing so that said weight is essentially a non-lifting balancing weight, auxiliary power means to move said weight relative to said wing, and control means governed by the oscillation of the wing about said auxiliary axis to control the movement of said weight to balance said vibratory force.

14. In combination in an aircraft of the direct lift type, a blade, means for supporting said blade on said aircraft for rotation about an upright axis and for flapping movement about an axis transverse to said upright axis, a weight, means for supporting said weight for rotation with said blade about said upright axis and for shifting movement in translation in a plane substantially normal to said upright axis, means responsive to changes in the position of said blade in its orbit, and power operated means controlled by said responsive means for applying force to said weight in the direction to cause cyclic movement thereof relative to said upright axis.

15. In combination in an aircraft of the direct lift type, a blade, means for supporting said blade on said aircraft for rotation about an upright axis and for flapping movement about an axis transverse to said upright axis, a weight, means for supporting said weight for rotation with said blade about said upright axis and for shifting movement primarily in translation toward and away from said axis, power operated means for applying force to said weight in the direction to cause movement thereof toward said axis, and means responsive to changes in the orbital position of said blade about said upright axis for controlling the operation of said power operated means.

EDWARD A. STALKER.

REFERENCES CITED

The following references are of record in the file of this patent:

UNITED STATES PATENTS

| Number | Name | Date |
| --- | --- | --- |
| 2,242,457 | Cierva | May 20, 1941 |
| 2,247,034 | Pitcairn | June 24, 1941 |
| 2,173,291 | Ash | Sept. 19, 1939 |
| 2,238,989 | Bradbury | June 24, 1941 |

Certificate of Correction

Patent No. 2,425,650. August 12, 1947.

EDWARD A. STALKER

It is hereby certified that errors appear in the above numbered patent requiring correction as follows: In the grant, line 6, title of invention, for "BLADE-BLANCING" read *BLADE-BALANCING*; in the printed specification, column 4, line 34, claim 2, for "said shifting of the wetight" read *the shifting of said weight*; column 8, line 19, in the list of references cited, for "June 24, 1941" read *April 22, 1941*; and that the said Letters Patent should be read with these corrections therein that the same may conform to the record of the case in the Patent Office.

Signed and sealed this 28th day of October, A. D. 1947.

[SEAL]

THOMAS F. MURPHY,
*Assistant Commissioner of Patents.*